Jan. 29, 1952     J. W. HARVEY     2,583,942
FISH LURE AND METHOD OF MANUFACTURE
Filed May 27, 1947
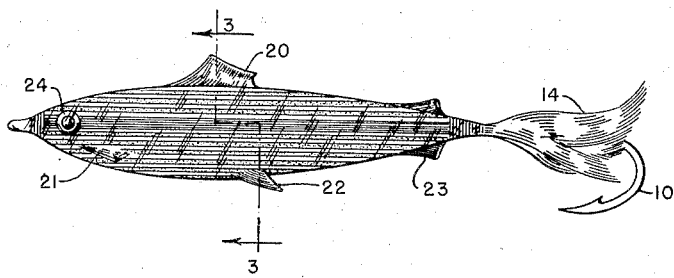
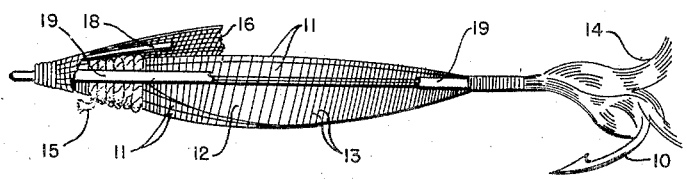
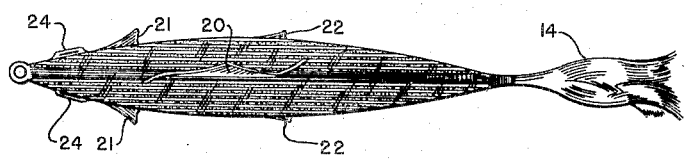
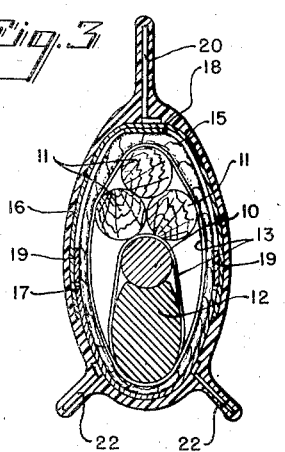
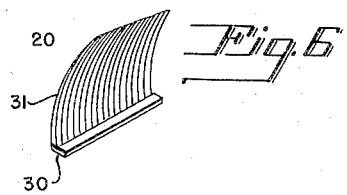
*INVENTOR.*
James W. Harvey
BY
ATTORNEY Patented Jan. 29, 1952

2,583,942

UNITED STATES PATENT OFFICE 2,583,942

FISH LURE AND METHOD OF MANUFACTURE

James W. Harvey, Lakeville, Conn., assignor to Starr Allyn Harvey, Lakeville, Conn.

Application May 27, 1947, Serial No. 750,842

3 Claims. (Cl. 43—42.28)

My invention relates to lures of the general character of those shown in my former Patent No. 2,134,401 and my Patent No. 2,501,723 dated March 28, 1950, and this application is a partial continuation of said application and claims improvements thereon in the method and products claimed in said application.

One object is to improve the appearance of such lures by making them much more lifelike in shape and color effect and another object is to improve the swimming action.

In its preferred form the lure is made to closely resemble a small minnow or smelt. This is effected by building up a body about the shank of a hook and enclosing it in tinsel ribbons or strips to which eye discs and fin elements formed of feather segments are cemented at appropriate points to stimulate a small fish and the whole, including the feather segments and discs, coated with a thick layer or layers of heavy plastic lacquer. The glittering effect created by the reflection from the metallic filaments of the tinsel ribbon closely simulates the scales of a fish and the fins not only add to the deception created, but cause the lure, when moved through the water, to have a very natural swimming action. Various effects may be produced by the use of variously colored tinsel ribbons, colored fins, eye members and filler strips as will be understood hereinafter.

Fig. 1 is a side view of a lure embodying one form of my invention.

Fig. 2 is a plan view of the same.

Fig. 3 is a cross sectional view of the device of Fig. 1 taken on the plane of the line 3—3 and on a larger scale.

Fig. 4 is a schematic side view of a modified form of lure with parts broken away to show the interior construction.

Fig. 5 is a plan view of a strip or ribbon formed of filaments of rayon and shiny metal suitably bound together and substantially transparent between the metal elements or tinsel. This material I will call a "tinsel ribbon."

Fig. 6 is a perspective view of a fragment of feather used to form a fin-simulating element.

The lure may be made in various sizes and made light enough to float or heavy enough to sink. The form of hook 10 is conventional and will have its shank extended for attachment of a line or leader in any suitable manner.

The body of the lure is built up by securing to the shank of the hook a number of taper-ended splints 11 and if desired a tapered or bulbous weight of metal 12 by means of spaced turns of thread 13 wound about the splints, weight and shank. Tail feathers or hairs 14 will also usually be tied to the shank to partially cover the barbed end of the hook.

A layer of yarn or tape 15 is then wound on the splints and shank and the weight (if used) to form a foundation for the shell of tinsel ribbon formed by two overlapping strips 16, 17 which are applied above and below the body and tied by thread at their ends.

By inserting longitudinal strips 18 and 19 of colored tape or yarn along the back and sides of the body before tying on the tinsel ribbon various attractive color effects can be produced—for instance by using a black strip along the back and blue or red strips along the sides. The body is then coated with or soaked in a thin, quick drying mixture of lacquer to seal it and prepare it for the plastic envelope.

Then the fin elements 20, 21, 22, 23 and eye discs 24 are cemented to the tinsel ribbon in appropriate positions. These fin elements are made of segments of the shafts of turkey feathers cut to the desired size and shape. Not all of these fin elements are required but preferably I use a main back fin element 20 which can be applied along a line so as to cause the lure to turn from side to side when drawn through the water. This action is also increased by using two fin elements 21 near the front or head end of the lure.

After the fin elements have been cemented in place the entire body with the attached fin elements is given two or more successive coats of heavy lacquer, each of which is allowed to dry and become very hard and transparent. After each coat is applied the lure is slowly rotated continuously about a longitudinal axis until the lacquer sets and firmly anchors the fin elements. The object of rotating the lure is to prevent the lacquer from running off or settling to one end or side of the body.

In Fig. 4, splints 11 are shown above and below the shank of the hook 10.

It should be understood that the bodies with the fish-scale-simulating tinsel ribbon can be made up to simulate different fish bodies and that the fin elements of selected size, shape and color can be then applied according to the effect desired.

The tinsel ribbon is in part transparent or at least sufficiently translucent between the metal filaments so that the color of the narrow tape or yarn inside will be plainly noticeable through it when the lacquer is applied.

In the claims the word tape is intended to cover material such as braided, woven or cemented strands or yarn which has some body but can be laid smoothly.

Such tinsel ribbon is preferably made of rayon and fine silver plated flattened copper wire and may have strips of cellophane for transparency.

Each fin element is formed from the flexible distal part of the shaft or stem of a feather, such as a turkey feather. The shaft is split longitudinally so as to provide a flat base 30 from which the barbs 31 extend along the edge at approximately right angles to the plane of the cut surface. The ends of the barbs are then trimmed to the proper length for the fin desired. This trimming is best accomplished by burning off the ends of the barbs or by stamping with a die. The flat surface resulting from the splitting of the flexible shaft or stem of the feather affords a substantial base for cementing the element to the curved outer wall of the body of the lure.

I claim:

1. A fish lure comprising a hook having a shank with a body secured thereon including a layer of colored tape wound around the shank, a colored strip of material along the surface of the layer of tape, tinsel ribbon enclosing the tape and colored strip, said ribbon including transparent portions through which the color of the tape and strip may be noticed with shiny metallic filaments extending longitudinally of the shank of the hook and an envelope of transparent plastic enclosing the body.

2. A fish lure comprising a hook having a shank, a body secured on the shank including colored elements, tinsel ribbon extending longitudinally of the body and covering said elements and having transparent areas and spaced shiny metallic filaments, projecting fin and eye elements cemented to said ribbon and an envelope of transparent plastic enclosing the body and fin elements.

3. The method of forming a fish lure which comprises tying a body member to the shank of a hook, applying a colored strip of tape along the side of the body member, securing a ribbon along the back of the body of the lure, cementing a segment of feather along the back of said ribbon to form a back fin, cementing other segments of feather to the body near the head end to form fins extending outward and downward therefrom and applying an envelope of transparent plastic material to the body and the said fins.

JAMES W. HARVEY.

REFERENCES CITED

The following references are of record in the file of this patent:

UNITED STATES PATENTS

| Number | Name | Date |
| --- | --- | --- |
| 1,640,599 | Conn | Aug. 30, 1927 |
| 1,657,734 | Wright | Jan. 31, 1928 |
| 1,975,218 | Worden | Oct. 2, 1934 |
| 2,134,401 | Harvey | Oct. 25, 1938 |
| 2,154,756 | Wolfe | Apr. 18, 1939 |
| 2,236,241 | Wolfe | Mar. 25, 1941 |
| 2,309,902 | Harvey | Feb. 2, 1943 |

FOREIGN PATENTS

| Number | Country | Date |
| --- | --- | --- |
| 9,868 | Great Britain | 1915 |

OTHER REFERENCES

"How to Tie Flies" by E. C. Gregg, copyright 1935 by E. C. Gregg, page 17. (Copy in Division 2.)